Patented Dec. 13, 1927.

1,652,781

UNITED STATES PATENT OFFICE.

CAMILLO JOSEPH GOODWIN, OF LONDON, ENGLAND, ASSIGNOR TO THE MATHIESON ALKALI WORKS, OF NEW YORK, N. Y., A CORPORATION OF VIRGINIA.

PROCESS OF SYNTHESIZING OXIDES OF NITROGEN.

No Drawing. Application filed September 4, 1923, Serial No. 660,936, and in Great Britain September 5, 1922.

This invention relates to improvements in the manufacture of oxides of nitrogen and nitric acid.

It has already been proposed to manufacture these substances, by the explosion under pressure, in a bomb, internal combustion engine, or the like, of a mixture of a combustible gas, such as coke oven gas, or coal gas, with air, or air and oxygen, and the present invention relates to improvements in processes of this kind.

I have discovered that if the combustible gas to be used for the purpose, is first so treated as to remove either substantially the whole, or a part, of the free hydrogen contained therein, the resulting gas is better adapted for the formation of the desired products, than it was before such treatment, and the invention therefore consists, inter alia, in the manufacture of oxides of nitrogen and nitric acid, by the explosion with air, or air and oxygen, of a combustible gas, such as for example, coke oven gas, which has previously been so treated as to remove substantially the whole or a part of its contents of free hydrogen.

The hydrogen removed can be separately collected, and used for any desired purpose. but it will be found to be useful for the manufacture of synthetic ammonia. In fact, the present process can be utilized with particular advantage in conjunction with a process for the production of ammonia, as the oxygen obtained as a by-product in the manufacture of nitrogen from the air, (which nitrogen is utilized for the manufacture of ammonia, or other products) can be used for mixing with the air with which the combustible gas is exploded, while the hydrogen removed from the latter can be employed for making ammonia with the aforesaid nitrogen.

I have found that the removal of hydrogen increases the net calorific value of the combustible gas, as when hydrogen is burnt with air or oxygen, water is formed, and part of the heat evolved is used as latent heat in the formation of steam, and this loss of heat is avoided when the hydrogen is removed.

The invention is carried out as follows:—

The gas to be utilized may consist of coke oven gas, or other suitable fuel gases, such as for example, coal gas, water gas, producer gas or the like may be employed. All of these gases contain varying and considerable quantities of free hydrogen. In each case, either substantially the whole or a part of this free hydrogen is removed. This removal may be effected in any suitable manner, for example, by fractional liquefaction, low temperature separation, or the like; alternatively, other physical means, such as for example, centrifugal separation, pressure fractionation or the like, or chemical means for the removal, may also be used if desired, and one example of such chemical means will be referred to below.

The dehydrogenated gas is in each case exploded with a suitable quantity of air or air and oxygen, and this explosion may be carried out in a bomb, or the like, or if desired, in an explosion motor, suitably modified internal combustion engine, or other device, whereby the calorific value of the gases may be partly recovered in the form of useful energy. Other investigators using untreated combustible gases have found that the yield of oxides of nitrogen and nitric acid is increased if oxygen is added to the air used for the explosion, and this also applies to the use of gases treated according to the present invention.

The gases resulting from the explosion are allowed to cool and/or expand in any convenient manner, as soon as possible after the explosion, and they are freed from oxides of nitrogen and nitric acid in any known and/or convenient manner, preferably after expansion, and while still under a pressure of say 3–4 atmospheres. When the explosion is carried out with the minimum quantity of air, or air and oxygen, it will be found that the gases remaining after such removal consist mainly of free nitrogen, carbon dioxide and water, and these gases may therefore be utilized as a source of nitrogen for the manufacture of ammonia, or for other purposes. If desired, they may be added to the nitrogen obtained from the atmosphere by removal of oxygen, (which latter is utilized for the explosion,) and the mixture of the nitrogen obtained from these two sources may then be utilized for the manufacture of synthetic ammonia, or for other purposes as mentioned above.

I do not desire to be limited to any particular explosion pressure, or to any particular theoretical explanation, but it would appear that one of the reasons why the dehydrogenation of fuel gases renders them more suitable for the purpose described, is that the calorific value of the gases per unit of volume is thereby increased. The removal of carbon dioxide, which is inactive for the purpose in view, will also increase the calorific value of the gas, and where the hydrogen is removed by means of fractional liquefaction, low temperature separation, or like method, carbon dioxide would necessarily also be removed.

It follows from the above, that other methods of raising the net calorific value of the gas to be used for the explosion, such as the removal of some or all of one or more constituents, other than hydrogen, of the fuel gas, would fall within the scope of the persent invention.

The following examples of results of my investigations are given by way of illustration only, and not as a limitation:—

*Example 1.*

25,000 cubic metres of coke oven gas, having a calorific value of about 3,700 calories per cubic metre, yielded after removal of about 85% of the free hydrogen, about 13,000 cubic metres of a gas having a calorific value of about 5,500 calories per cubic metre. Explosion of this gas yielded about 250 grams of nitric acid, ($HNO_3$ reckoned as 100%) per cubic metre, as against about 150–175 grams per cubic metre of the untreated coke oven gas.

*Example 2.*

A coke oven gas, having a calorific value of 4,600 calories per cubic metre, and the following composition:—

$CO_2$—1.6%, $O_2$—0.4%, $C_nH_m$—3.0%, $CO$—6.5%, $CH_4$—31.3%, $H_2$—52.4%, $N_2$—4.8% treated so as to remove about 85% of the free hydrogen, and such other constituents, as would necessarily be removed by this treatment, yielded a gas of the following approximate composition:—

$CO$—12%, $CH_4$—62%, $H_2$—16%, $N_2$—10%, and a calorific value of about 6,000 calories per cubic metre. This gas gave results showing a similar improvement to that specified in Example 1.

Instead of treating the gas mentioned in Example 2, by a liquefaction method, a suitable quantity of carbon monoxide could be added to it, and the mixed gas then used under pressure for the manufacture of methyl or ethyl alcohol, by catalytic or other means, whereby a part or substantially the whole of the free hydrogen and carbon monoxide would be removed, leaving mainly methane, a combustible gas of high calorific value, ready compressed for use, according to the invention.

An example of a known process for making alcohol is that in which a mixture of one part by volume of carbon monoxide together with two parts by volume of hydrogen, are passed under pressure over a heated catalyst, with the result that ethyl alcohol is produced, with a certain amount of residual methane; the same mixture of gases with a suitable catalyst is also capable of being transformed into methyl alcohol.

Now water gas usually contains approximately equal quantities of carbon monoxide and hydrogen, and to obtain the desired gas mixture, further quantities of hydrogen must be added, which is costly. If instead of water gas, a coke oven gas, such as in Example 2 is used, containing 52.4 per cent of hydrogen, and sufficient carbon monoxide, is added to increase the percentage content from 6.5 per cent to 26.2 per cent, then on passing this mixed gas over a catalyst in the way described for the manufacture of alcohols, the greater part of the hydrogen and carbon monoxide will be removed, leaving mainly methane ready compressed for use as described.

However, I make no claim per se to this method of making ethyl or methyl alcohol.

The increased calorific value of the treated gas, enables the power requirements of the process, such as for the compression of gas or air, motive power, and the like, to be covered by utilizing the heating value of the exhaust gases, and renders the use of external sources of power unnecessary, whilst the hydrogen obtained, is in any case, a valuable by-product.

Although I have stated that the nitrogen and hydrogen obtained as by-products, according to my improved process, may advantageously be used for the manufacture of synthetic ammonia, yet the invention is not limited in this respect, as these substances could equally well be put to any other useful purpose.

I claim:—

1. In the manufacture of oxygen containing compounds of nitrogen from combustible gas mixtures containing free hydrogen in addition to other combustible components by exploding the same with gas mixtures containing oxygen and nitrogen, the improvement which comprises removing free hydrogen from the combustible gas mixture and thereafter exploding the combustible gas mixture from which hydrogen has been removed with a gas mixture containing oxygen and nitrogen.

2. In the manufacture of oxygen containing compounds of nitrogen from combustible gas mixtures containing free hydrogen in addition to other combustible components by exploding the same with gas mixtures containing oxygen and nitrogen, the improvement which comprises removing substantially the whole of the free hydrogen from the combustible gas mixture and thereafter exploding the combustible gas mixture denuded of free hydrogen with a gas mixture containing oxygen and nitrogen.

3. The improved manufacture of oxygen containing compounds of nitrogen from combustible gas mixtures containing free hydrogen in addition to other combustible components, which comprises removing at least a portion of the free hydrogen therefrom and thereafter exploding with air the gas from which hydrogen has been removed.

4. The improved manufacture of oxygen containing compounds of nitrogen from combustible gas mixtures containing free hydrogen in addition to other combustible components, which comprises removing at least a portion of the free hydrogen therefrom and thereafter exploding with air and oxygen the gas from which hydrogen has been removed.

5. The improved manufacture of oxygen containing compounds of nitrogen, which comprises removing substantially the whole of the free hydrogen from coke oven gas and thereafter exploding the gas denuded of hydrogen with a gas mixture containing oxygen and nitrogen.

6. The method of manufacturing oxygen containing compounds of nitrogen, which comprises increasing the net calorific value of combustible gas mixtures by removing therefrom combustible components forming water on combustion, and exploding the remainder of the combustible gas mixture from which such components have been removed with a gas mixture containing oxygen and nitrogen.

In witness whereof I affix my signature.

CAMILLO JOSEPH GOODWIN.